US012693542B2

(12) United States Patent　　(10) Patent No.:　US 12,693,542 B2
Ogawa　　(45) Date of Patent:　Jul. 28, 2026

(54) ELECTRONIC DEVICE AND METHOD FOR CONTROLLING ELECTRONIC DEVICE

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 218 days.

(21) Appl. No.: 18/625,615

(22) Filed: Apr. 3, 2024

(65) Prior Publication Data

US 2024/0345407 A1　　Oct. 17, 2024

(30) Foreign Application Priority Data

Apr. 14, 2023　(JP) ................................. 2023-066453

(51) Int. Cl.
| | |
|---|---|
| *G02B 27/01* | (2006.01) |
| *G06F 3/01* | (2006.01) |
| *G06F 3/04815* | (2022.01) |
| *G06F 3/0485* | (2022.01) |
| *G06F 3/0488* | (2022.01) |

(52) U.S. Cl.
CPC ..... *G02B 27/0179* (2013.01); *G02B 27/0172* (2013.01); *G06F 3/011* (2013.01); *G06F 3/04815* (2013.01); *G06F 3/0485* (2013.01); *G06F 3/0488* (2013.01); *G02B 2027/0178* (2013.01)

(58) Field of Classification Search
None
See application file for complete search history.

(56) References Cited

U.S. PATENT DOCUMENTS

2019/0132569 A1* 5/2019 Karpenko ............... G06T 7/246

FOREIGN PATENT DOCUMENTS

JP　　2019-121918 A　　7/2019

OTHER PUBLICATIONS

U.S. Appl. No. 18/437,365, filed Feb. 9, 2024 by Wataru Suzuki.

* cited by examiner

*Primary Examiner* — Phu Vu
(74) *Attorney, Agent, or Firm* — VENABLE LLP

(57) ABSTRACT

An electronic device includes: a processor; and a memory storing a program which, when executed by the processor, causes the electronic device to: switch between a first screen that displays a VR image individually and a second screen that displays a plurality of images including the VR image; and control a change in a display area of the VR image, wherein on the first screen, the display area of the VR image is changed based on a predetermined operation for changing the display area of the VR image, and on the second screen, the display area of the VR image is not changed based on the predetermined operation.

14 Claims, 8 Drawing Sheets

*FIG. 2A*
*FIG. 2B*
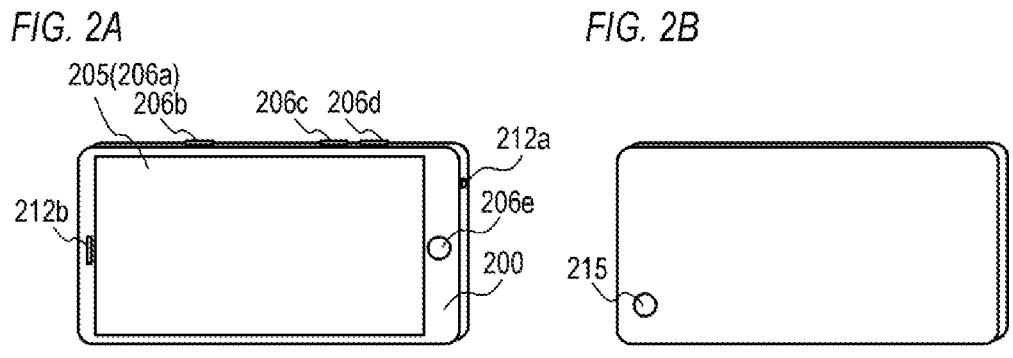
*FIG. 2C*
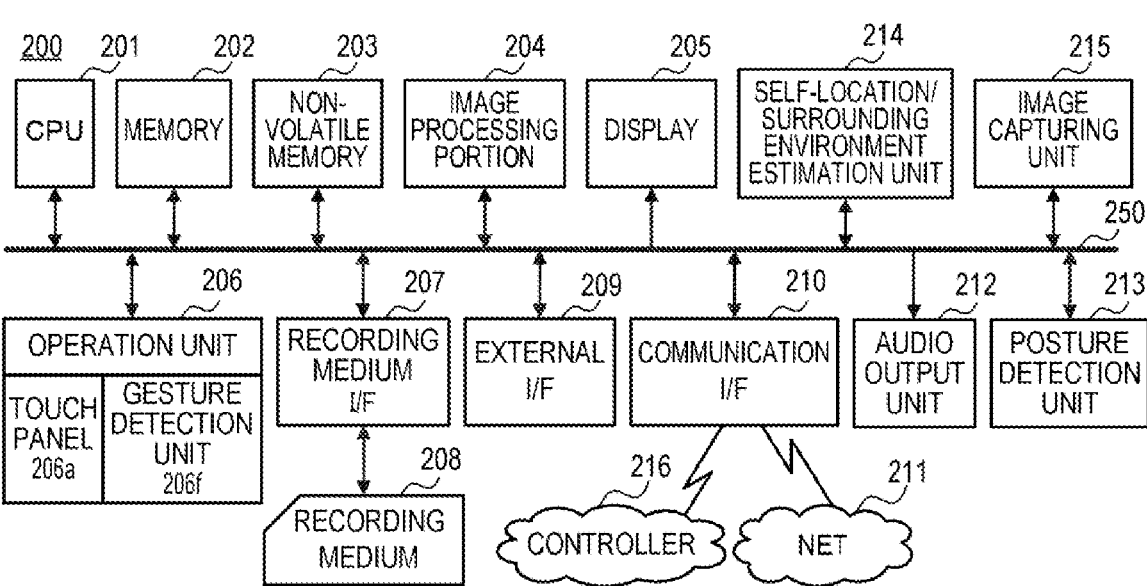
*FIG. 2D*
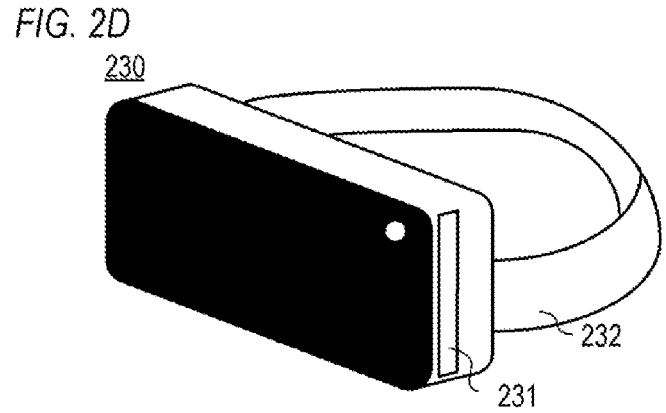

ELECTRONIC DEVICE AND METHOD FOR CONTROLLING ELECTRONIC DEVICE

BACKGROUND OF THE INVENTION

Field of the Invention

The present invention relates to an electronic device and a method for controlling an electronic device.

Description of the Related Art

To allow other users to view (and to share) a virtual reality (VR) image, including an omnidirectional image and saved on a server on a network, through their display devices, a technique is known that causes the VR image to be viewed in a specific direction. For example, when sharing a VR image, the sharer can specify a specific direction to display the VR image so that the viewers view the same in the specific direction.

Additionally, in a viewing environment of a VR image such as an SNS, a technology is known that starts playing the VR image from a specific direction specified by the sharer and allows the display area of the VR image to be changed by a manual operation by the viewer (such as touch operation and device posture change). Furthermore, the display area of the VR image is automatically moved in the pan direction in response to a scroll operation of the timeline on the SNS, thereby allowing the viewer to view the display area that reflects the intention of the sharer and to easily recognize that the displayed image is a VR image.

However, if processing by the display device to automatically change the display area so as to reflect the sharer's intention is performed simultaneously with processing to allow the viewer to manually change the display area freely, the VR image may become difficult to be viewed because of disordered behavior.

Japanese Patent Application Publication No. 2019-121918 discloses a technology that controls so as to accept a manual operation by the viewer for a specific frame of a VR moving image, and controls so as not to accept a manual operation for other frames and automatically displays a specific direction. Accordingly, processing by the display device to automatically change the display area and processing to allow the viewer to manually change the display area are not simultaneously performed.

However, even though the methods of changing the display area of the VR image (whether to change automatically or manually) can be switched according to whether the frame of the VR image (moving image) is the specific frame, the methods may not be appropriately switched in accordance with the viewing state of the VR image.

SUMMARY OF THE INVENTION

The present invention provides an electronic device that can achieve both a viewing environment that reflects the intention of the sharer and an environment in which the viewer can freely view a VR image in accordance with the viewing state of the VR image.

A first aspect of the present invention is an electronic device including: a processor; and a memory storing a program which, when executed by the processor, causes the electronic device to: switch between a first screen that displays a VR image individually and a second screen that displays a plurality of images including the VR image; and control a change in a display area of the VR image, wherein on the first screen, the display area of the VR image is changed based on a predetermined operation for changing the display area of the VR image, and on the second screen, the display area of the VR image is not changed based on the predetermined operation.

A second aspect of the invention is a method for controlling an electronic device, the method comprising: switching between a first screen that displays a VR image individually and a second screen that displays a plurality of images including the VR image; and controlling a change in a display area of the VR image, wherein on the first screen, the display area of the VR image is changed based on a predetermined operation for changing the display area of the VR image, and on the second screen, the display area of the VR image is not changed based on the predetermined operation.

A third aspect of the present invention is a non-transitory computer-readable medium that stores a program for causing a computer to execute a control method of an electronic device, the control method comprising: switching between a first screen that displays a VR image individually and a second screen that displays a plurality of images including the VR image; and controlling a change in a display area of the VR image, wherein on the first screen, the display area of the VR image is changed based on a predetermined operation for changing the display area of the VR image, and on the second screen, the display area of the VR image is not changed based on the predetermined operation.

Further features of the present invention will become apparent from the following description of exemplary embodiments with reference to the attached drawings.

BRIEF DESCRIPTION OF THE DRAWINGS

FIGS. 2A and 2B are external views of a display control device;

FIG. 2C is a block diagram of a display control device;

FIG. 2D is an external view of VR goggles;

DESCRIPTION OF THE EMBODIMENTS

Figures 1A, 1B, 1C:
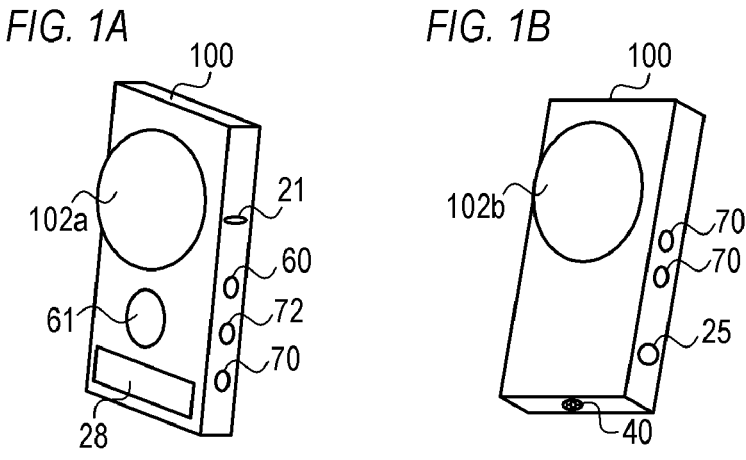
FIGS. 1A and 1B are external views of a digital camera according to the present embodiment.
FIG. 1C is a block diagram of a digital camera according to the present embodiment.

Embodiments of the present invention are now described with reference to the drawings. FIG. 1A is a front perspective view (external view) of a digital camera 100 (image capturing device). FIG. 1B is a rear perspective view (external view) of the digital camera 100. The digital camera 100 is a camera (omnidirectional camera) for capturing omnidirectional images.

A barrier 102a is a protective window for the front camera portion whose photographing area is the front of the digital camera 100. For example, the front camera portion may be a wide-angle camera portion that captures a wide range of 180 degrees or more laterally and vertically on the front side of the digital camera 100. A barrier 102b is a protective window for the rear camera portion whose photographing area is the rear of the digital camera 100. For example, the rear camera portion may be a wide-angle camera portion that captures a wide range of 180 degrees or more laterally and vertically on the rear side of the digital camera 100.

A display unit (display) 28 displays various types of information. A shutter button 61 is an operation unit (operation member) for instructing the capturing of an image. A mode changeover switch 60 is an operation unit for switching between various modes. A connection I/F 25 is a connector for connecting a connection cable to the digital camera 100, and an external device, such as a smartphone, personal computer, or television, is connected to the digital camera 100 using a connection cable. Operation units 70 may be various switches, buttons, dials, touch sensors, and the like for receiving various operations from the user. A power switch 72 is a push button for switching on/off the power.

A light emitting unit 21 is a light emitting member, such as a light emitting diode (LED), and notifies the user of various states of the digital camera 100 using light emitting patterns and light emitting colors. A fixing portion 40 may be a tripod screw hole, for example, and is used to fix and install the digital camera 100 using a fixing tool such as a tripod.

FIG. 1C is a block diagram showing a configuration example of the digital camera 100. The barrier 102a covers the imaging system (an imaging lens 103a, a shutter 101a, an imaging unit 22a, and the like) of the front camera portion to prevent the imaging system from being soiled or damaged. The imaging lens 103a is a lens group including a zoom lens and a focus lens, and is a wide-angle lens. The shutter 101a has an aperture function for adjusting the amount of subject light incident on the imaging unit 22a. The imaging unit 22a is an imaging element (imaging sensor), which may be a CCD or a CMOS, for converting an optical image into an electric signal. An A/D converter 23a converts an analog signal output from the imaging unit 22a into a digital signal. Alternatively, the barrier 102a may be omitted, the outer surface of the imaging lens 103a may be exposed, and the imaging lens 103a may prevent other parts of the imaging system (the shutter 101a and the imaging unit 22a) from being soiled or damaged.

The barrier 102b covers the imaging system (an imaging lens 103b, a shutter 101b, and imaging unit 22b, and the like) of the rear camera portion to prevent the imaging system from being soiled or damaged. The imaging lens 103b is a lens group including a zoom lens and a focus lens, and is a wide-angle lens. The shutter 101b has an aperture function for adjusting the amount of subject light incident on the imaging unit 22b. The imaging unit 22b is an imaging element, which may be a CCD or a CMOS, for converting an optical image into an electric signal. An A/D converter 23b converts an analog signal output from the imaging unit 22b into a digital signal. Alternatively, the barrier 102b may be omitted, the outer surface of the imaging lens 103b may be exposed, and the imaging lens 103b may prevent other parts of the imaging system (the shutter 101b and the imaging unit 22b) from being soiled or damaged.

The imaging unit 22a and the imaging unit 22b capture virtual reality (VR) images. A VR image is an image that can be displayed in VR (can be displayed in the "VR view" display mode). VR images include, for example, an omnidirectional image captured by an omnidirectional camera, and a panoramic image with a video image area (effective video image area) wider than the display area that can be displayed on the display unit at a time. VR images include not only still images but also moving images and live view images (images obtained from a camera in substantially real time). A VR image has a video image area (effective video image area) of the field of view of 360 degrees at maximum in the up-down direction (vertical angle, angle from the zenith, elevation angle, depression angle, altitude angle, pitch angle) and 360 degrees at maximum in the right-left direction (horizontal angle, azimuth angle, yaw angle). The VR image is, for example, a circular fisheye image or an equidistant cylindrical image obtained by converting a circular fisheye image, and the VR view is made possible by further performing perspective projection conversion on the image.

VR images also include an image that has a wide angle of view (visual field area) wider than the angle of view that can be captured by a normal camera, even when the angle is less than 360 degrees in the up-down direction and less than 360 degrees in the right-left direction, or has a video image area (effective video image area) wider than the display area that can be displayed on the display unit at a time. For example, an image captured by an omnidirectional camera capable of capturing a subject with a field of view (angle of view) of 360 degrees in the right-left direction (horizontal angle, azimuth angle) and a vertical angle of 210 degrees centered about the zenith is one type of VR image. For example, an image captured by a camera capable of capturing a subject with a field of view (angle of view) of 180 degrees in the right-left direction (horizontal angle, azimuth angle) and a vertical angle of 180 degrees centered about the horizontal direction is one type of VR image. That is, an image that has a video image area of a field of view of 160 degrees (±80 degrees) or more in the up-down direction and the right-left direction and has a video image area that is wider than the area a human can visually perceive at a time is one type of VR image.

When such a VR image is displayed in VR (displayed in the "VR view" display mode), the user can view a seamless omnidirectional video image in the right-left direction (horizontal rotation direction) by changing the posture of the display device (display device displaying the VR image) in the right-left rotation direction. In the up-down direction (vertical rotation direction), a seamless omnidirectional video image can be viewed in the range of ±105 degrees from directly above (zenith). However, the area beyond 105 degrees from directly above is a blank region with no video images. A VR image can also be described as "an image whose video image area is at least a part of a virtual space (VR space)".

The VR display (VR view) is a display method (display mode) that can change the display area. The VR display displays a video image of a visual field area corresponding to the posture of the display device in the VR image. When the user wears a head-mounted display (HMD) as the display device for viewing, a video image of the visual field area corresponding to the orientation of the user's face is displayed. For example, assume that a video image of a view angle (angle of view) centered at 0 degrees in the right-left direction (a specific direction, such as north) and 90 degrees in the up-down direction (90 degrees from the zenith, that is, horizontal) is displayed in a VR image at a specific point of time. Then, when the posture of the display device is reversed from this state (for example, when the orientation of the display surface is changed from south to north), the display area is changed to a video image of a view angle centered at 180 degrees in the right-left direction (opposite direction, such as south) and 90 degrees in the up-down direction (horizontal) within the same VR image. In a situation where the user views an HMD, when the user turns his or her face from north to south (that is, faces backward), the video displayed on the HMD is changed from a video image of the north to a video image of the south. Such VR display can provide the user with a feeling (immersive feeling) as if he or she were visually present in the VR image (inside the VR space). A smartphone attached to VR goggles (head-mounted adapter) may be considered as one type of HMD.

The display method of a VR image is not limited to the above. The display area may be moved by an operation by the user on the touch panel or the direction button, instead of a change in the posture. In VR display (in the "VR view" display mode), in addition to a change of the display area in response to a posture change, the display area may be changed in response to a touch-move on the touch panel, a drag operation of the mouse, pressing on the direction button, and the like.

An image processing unit 24 performs predetermined processing (e.g., pixel interpolation, resizing such as reduction, and color conversion) on data received from A/D converters 23a and 23b or data from a memory control unit 15. The image processing unit 24 also performs predetermined calculation processing using the captured image data. A system control unit 50 performs exposure control and distance measurement control based on the calculation result obtained by the image processing unit 24. This allows for processing such as through-the-lens (TTL) autofocus (AF) processing, autoexposure (AE) processing, and pre-flashing (FE) processing, for example. The image processing unit 24 further performs predetermined calculation processing using the captured image data, and performs TTL auto white balance (AWB) processing based on the obtained calculation result. Furthermore, the image processing unit 24 performs basic image processing on two images (two fisheye images; two wide-angle images) obtained from the A/D converters 23a and 23b. A single VR image is generated by performing image stitching that combines two images that have been subjected to basic image processing. During VR display in live view or during playback, the image processing unit 24 also performs image clipping, magnifying, distortion correction, and the like to display the VR image in VR, and performs rendering to draw the processing result in a predetermined storage region (VRAM) in the memory 32.

In the image stitching, the image processing unit 24 uses one of the two images as a reference image and the other as a comparative image, calculates the deviation amount between the reference image and the comparative image in each area by performing pattern matching, and detects, from the deviation amount in each area, the position at which the two images are stitched. The image processing unit 24 corrects the distortion of each image by geometric transformation taking into account the detected stitching position and the characteristics of each optical system lens, and converts each image into an image in the omnidirectional format (omnidirectional image format). The image processing unit 24 generates one omnidirectional image (VR image) by synthesizing (blending) two omnidirectional images. The generated omnidirectional image may be an image using equirectangular projection, for example, and the position of each pixel in the omnidirectional image can be associated with the surface coordinates of the sphere (VR space).

Output data from the A/D converters 23a and 23b is written to the memory 32 via the image processing unit 24 and the memory control unit 15, or via the memory control unit 15 without going through the image processing unit 24. The memory 32 stores image data that is obtained by the imaging units 22a and 22b and converted into digital data by the A/D converters 23a and 23b, and image data to be output from the connection I/F 25 to an external display. The memory 32 has a storage capacity sufficient to store a predetermined number of still images, and moving images and audio of predetermined duration.

The memory 32 also serves as memory for displaying images (video memory). Image display data stored in the memory 32 can be output from the connection I/F 25 to an external display. The VR images captured by the imaging units 22a and 22b, generated by the image processing unit 24, and stored in the memory 32 are sequentially transferred to an external display to be displayed, thereby achieving the function as an electronic viewfinder and enabling live view display (LV display). Hereinafter, an image displayed in the live view display is referred to as a live view image (LV image). Live view display (remote LV display) is also achievable by transferring VR images accumulated in the memory 32 to an external device (such as a smartphone) wirelessly connected via a communication unit 54 and displaying them on the external device.

A non-volatile memory 56 is an electrically erasable/recordable recording medium, such as electrically erasable programmable read-only memory (EEPROM). The non-volatile memory 56 records constants, a program, and other data for the operation of the system control unit 50. The program herein is a computer program for executing various types of processing.

The system control unit 50 is a control unit including at least one processor or circuitry and controls the entire digital camera 100. The system control unit 50 performs various types of processing of the present embodiment by executing a program recorded in the non-volatile memory 56. The system memory 52 may be random access memory (RAM), for example. The system control unit 50 loads data such as the constants and variables for the operation of the system control unit 50 and a program read from the non-volatile memory 56 in the system memory 52. The system control unit 50 also performs display control by controlling the memory 32, the image processing unit 24, and the memory control unit 15. A system timer 53 is a time measuring unit that measures the time used for various controls and the time of the built-in clock.

The mode changeover switch 60, the shutter button 61, and the operation units 70 are used to input various operation instructions to the system control unit 50. The mode changeover switch 60 may switch the operation mode of the system control unit 50 to any of a still-image recording mode, a moving-image shooting mode, a playback mode, a communication connection mode, and the like. Modes included in the still-image recording mode are an automatic shooting mode, an automatic scene determination mode, a manual mode, an aperture priority mode (Av mode), a shutter speed priority mode (Tv mode), and a program AE mode. Other available modes include various scene modes that constitute shooting settings for different image shooting scenes, and a custom mode. The mode changeover switch 60 allows the user to directly switch to any of these modes. Alternatively, after temporarily switching to a list screen of the shooting modes using the mode changeover switch 60, the user may use another operation member to select one of a plurality of modes displayed on the display unit 28 to switch the modes. In a similar manner, the moving-image shooting mode may also include a plurality of modes.

The shutter button 61 includes a first shutter switch 62 and a second shutter switch 64. The first shutter switch 62 is turned on during an operation of the shutter button 61 by a half-press (shooting preparation instruction) and generates a first shutter switch signal SW1. In response to the first shutter switch signal SW1, the system control unit 50 starts shooting preparation operation of autofocus (AF) processing, autoexposure (AE) processing, auto white balance (AWB) processing, pre-flashing (FE) processing, and the like.

The second shutter switch 64 is turned on upon completion of an operation of the shutter button 61 by a full-press (shooting instruction) and generates a second shutter switch signal SW2. In response to the second shutter switch signal SW2, the system control unit 50 starts a series of operations of shooting processing from reading the signal from the imaging units 22*a* and 22*b* to writing the image data into the recording medium 90.

It should be noted that the shutter button 61 is not limited to an operation member that can be operated in two steps of full-press and half-press, and may be an operation member that can be pressed only in one step. In this case, the shooting preparation operation and shooting operation are performed in succession by pressing the button in one step. This is the same operation as when the shutter button with which half-press and full-press are possible is fully pressed (when the first shutter switch signal SW1 and the second shutter switch signal SW2 are generated substantially at the same time).

The operation unit 70 is assigned appropriate functions for each scene by selecting and operating various function icons or options displayed on the display unit 28, and thus functions as various function buttons. Examples of the function buttons include an end button, a return button, an image scrolling button, a jump button, a depth-of-field button, and an attribute change button. For example, when the menu button is pressed, the display unit 28 displays a menu screen on which various settings can be made. The user can intuitively perform various settings by operating the operation unit 70 while looking at the menu screen displayed on the display unit 28.

A power-supply control unit 80 includes a battery detection circuit, a DC-DC converter, a switching circuit for switching between blocks to be energized, and the like and detects whether a battery is installed, the type of the battery, the remaining battery level, and the like. Additionally, the power-supply control unit 80 controls the DC-DC converter on the basis of detection results and an instruction from the system control unit 50 and supplies each unit, including the recording medium 90, with necessary voltage for a necessary period of time. A power supply unit 30 may include a primary battery, such as an alkaline battery or a lithium battery, a secondary battery, such as a NiCd battery, a NiMH battery, or a Li battery, or an AC adapter, for example.

A recording medium I/F 18 is an interface with the recording medium 90, which may be a memory card or a hard disk. The recording medium 90 may be a memory card for recording captured images and include a semiconductor memory, an optical disc, or a magnetic disk, for example. The recording medium 90 may be an exchangeable recording medium detachable from the digital camera 100, or a recording medium built into the digital camera 100.

The communication unit 54 transmits and receives video signals and audio signals, for example, to and from an external device connected wirelessly or by cable. The communication unit 54 can be connected to a wireless local area network (LAN) or the Internet, and can communicate with an external device (e.g., a server) on a network via the network. The communication unit 54 can also communicate with an external device via Bluetooth (registered trademark) or Bluetooth Low Energy. The communication unit 54 can transmit images (including LV images) captured by the imaging units 22*a* and 22*b* and images recorded on the recording medium 90, and can receive image data and various other types of information from an external device.

A posture detection unit 55 detects the posture of the digital camera 100 relative to the direction of gravitational force. According to the posture detected by the posture detection unit 55, a determination can be made as to whether an image captured by the imaging unit 22*a*, 22*b* is an image captured while holding the digital camera 100 horizontally or an image captured while holding the digital camera 100 vertically. As for an image captured by the imaging unit 22*a*, 22*b*, it is also possible to determine the degree to which the digital camera 100 was tilted in relation to the three axis directions (rotation directions) of yaw, pitch, and roll directions while capturing the image.

The system control unit 50 can add orientation information corresponding the posture detected by the posture detection unit 55 to the image file of a VR image captured by the imaging unit 22*a*, 22*b*, and record a rotated version of the image (after changing the orientation of the image to correct the tiling). One of an acceleration sensor, a gyro sensor, a geomagnetic sensor, a direction sensor, an altitude sensor, and the like, or any combination of these sensors may be used as the posture detection unit 55. A motion of the digital camera 100 (such as pan, tilt, lift, or whether it is stationary) can be detected with the acceleration sensor, gyro sensor, direction sensor, or the like forming the posture detection unit 55.

A microphone 20 collects sounds around the digital camera 100, which are recorded as sounds of a VR image as a moving image (VR moving image). A connection I/F 25 is a connection plug to which an HDMI (registered trademark) cable, a USB cable, or the like is connected for connecting to an external device and transmitting and receiving video images.

FIG. 2A is a front perspective view of the display control device 200. The display control device 200 is an example of an electronic device and may be a smartphone or a tablet terminal, for example. A display 205 is a display unit that displays images and various types of information. The display 205 is configured integrally with a touch panel 206*a* so that a touch operation on the display surface of the display 205 can be detected. The display control device 200 is capable of displaying a VR image (VR content) in VR on the display 205. An operation member 206*b* is a power button that receives an operation for switching the power of the display control device 200 between on and off. Operation members 206*c* and 206*d* are volume buttons for increasing or decreasing the volume of the sound output from a speaker 212*b*, earphones or an external speaker connected to an audio output terminal 212*a*. An operation member 206*e* is a home button for displaying a home screen on the display 205. The audio output terminal 212*a* is an earphone jack, and is a terminal for outputting an audio signal to earphones or an external speaker. The speaker 212*b* is a built-in speaker for outputting sound.

FIG. 2B is a rear perspective view of the display control device 200. An image capturing unit 215 is a camera capable of capturing images of the physical space.

FIG. 2C is a block diagram showing an example of the configuration of the display control device 200. A CPU 201, a memory 202, a non-volatile memory 203, an image processing unit 204, the display 205, an operation unit 206, a recording medium I/F 207, an external I/F 209, and a communication I/F 210 are connected to an internal bus 250. Additionally, an audio output unit 212, a posture detection unit 213, a self-location/surrounding environment estimation unit 214, and the image capturing unit 215 are also connected to the internal bus 250. The units connected to the internal bus 250 can exchange data with each other via the internal bus 250.

The CPU 201 is a control unit that controls the entire display control device 200 and includes at least one processor or circuitry. The memory 202 may be a RAM (volatile memory using a semiconductor elements), for example. According to the programs stored in the non-volatile memory 203, for example, the CPU 201 controls each unit of the display control device 200 using the memory 202 as a work memory. The non-volatile memory 203 stores image data, audio data, other data, and various types of information including various programs for operating the CPU 201. The non-volatile memory 203 may be a flash memory or a read-only memory (ROM).

Under the control of the CPU 201, the image processing unit 204 performs various types of image processing on images stored in the non-volatile memory 203 or the recording medium 208, video signals obtained via the external I/F 209, or images obtained via the communication I/F 210. The various types of image processing include A/D conversion, D/A conversion, coding of image data, compression of image data, decoding of image data, enlargement and reduction (resizing) of image data, noise reduction of image data, and color conversion of image data. The various types of image processing also include panorama stitching, mapping, and conversion of a VR image that is an omnidirectional image or a wide-area image that is not omnidirectional but includes a video image of a wide area. The image processing unit 204 may be a dedicated circuit block for performing specific image processing. Depending on the type of image processing, the CPU 201 can perform image processing according to a program without involving the image processing unit 204.

The display 205 displays images and a GUI screen that constitutes a graphical user interface (GUI) under the control of the CPU 201. The CPU 201 generates a display control signal according to the program and controls each unit of the display control device 200 to generate a video signal to be displayed on the display 205 and output it to the display 205. The display 205 displays a video image based on the video signal that is generated and output. It should be noted that the configurations inherent to the display control device 200 itself may include only up to the interface for outputting video signals to be displayed on the display 205, and the display 205 may be an external monitor (for example, a television or a head-mounted display).

The operation unit 206 includes various input units for receiving user operations. For example, the operation unit 206 includes a character information input device (e.g., a keyboard), a pointing device (e.g., a mouse or a touch panel), buttons, dials, joysticks, touch sensors, and touch pads. In this embodiment, the operation unit 206 includes a touch panel 206a, operation members 206b, 206c, 206d, and 206e, and a gesture detection unit 206f.

A recording medium 208, such as a memory card, CD, or DVD, can be attached to the recording medium I/F 207 in a detachable manner. Under the control of the CPU 201, the recording medium I/F 207 reads data from and writes data to the attached recording medium 208. The recording medium 208 is a storage unit that stores various data including images to be displayed on the display 205.

The external I/F 209 is an interface connected to an external device by wire or wirelessly to input and output video signals and audio signals. A communication I/F 210 is an interface that communicates with an external device or the Internet 211 to send and receive various data such as files and commands. The communication I/F 210 can also communicate with a controller 216.

An audio output unit 212 outputs audio of moving images or music data played by the display control device 200, operation sounds, ringtones, and various notification sounds. The audio output unit 212 includes the audio output terminal 212a for connecting earphones or an external speaker, and a speaker 212b, but the audio output unit 112 may output audio data to an external speaker through wireless communication.

The posture detection unit 213 detects the posture (tiling) of the display control device 200 with respect to the direction of gravity, and the posture of the display control device 200 with respect to each of the axes of the yaw, pitch, and roll directions, and notifies the CPU 201 of the posture information. According to the posture detected by the posture detection unit 213, it is possible to determine whether the display control device 200 is held horizontally, held vertically, oriented upward, oriented downward, or in an oblique posture. It is also possible to determine whether the display control device 200 is tilted in the rotation directions including the yaw, pitch, and roll directions, the degree of tilting, and whether the display control device 200 has been rotated in the rotation directions. One of an acceleration sensor, a gyro sensor, a geomagnetic sensor, a direction sensor, an altitude sensor, and the like, or any combination of these sensors may be used as the posture detection unit 213.

The self-location/surrounding environment estimation unit 214 estimates the self-location and surrounding environment of the display control device 200 or the VR goggles 230 described below.

The self-location is the position of the display control device 200 or the VR goggles 230 within a predetermined range of space. The self-position is represented by three parameters indicating a position in a coordinate system that has the origin point at a predetermined position in a space of a predetermined area and is defined by three axes of X, Y, and Z axes intersecting with one another at right angles at the predetermined position. The self-location may be represented further using three parameters representing the posture (orientation).

The surrounding environment includes an obstacle region. The obstacle region is a region of an object that is present around the display control device 200 or the VR goggles 230 and is an obstacle for the user holding the display control device 200 or the user wearing the VR goggles 230. For example, the obstacle region is represented by a plurality of groups of three parameters indicating positions in a coordinate system that has the origin point at a predetermined position in a space of a predetermined area and is defined by three axes of X, Y, and Z axes intersecting with one another at right angles at the predetermined position.

An image capturing unit 215 is a camera capable of capturing images of the physical space. An image obtained by capturing the physical space can be used for various type of detection processing, and is used by the gesture detection unit 206f and the self-location/surrounding environment estimation unit 214, for example. An image obtained by capturing the physical space can be displayed on the display 205.

The operation unit 206 includes a touch panel 206a. The touch panel 206a is an input device that is superimposed on the display 205 and has a two-dimensional configuration, and outputs coordinate information according to the touched position. The CPU 201 can detect the following operations or states on the touch panel 206a.

A new touch on the touch panel 206a by an operating member (a finger or a stylus) previously not in touch with the touch panel 206a, in other words, a start of a touch (hereinafter referred to as a touch-down)

A state where the touch panel 206a is being touched by an operating member (hereinafter referred to as a touch-on)

An operating member moving while in touch with the touch panel 206a (hereinafter referred to as a touch-move)

A separation from the touch panel 206a by an operating member previously in touch with the touch panel 206a, in other words, an end of a touch (hereinafter referred to as a touch-up)

A state where nothing is touching the touch panel 206a (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is simultaneously detected. Even when a touch-on is detected, a touch-move is not detected unless a touch position moves. A touch-off is detected when a touch-up is detected for all operating members that were in touch.

The CPU 201 is notified of these operations and states and the coordinates of the position of the touch panel 206a touched by the operating member via the internal bus. According to the notified information, the CPU 201 determines what type of operation (touch operation) has been performed on the touch panel 206a. For a touch-move, a movement direction of the operating member moving on the touch panel 206a can also be determined for each of a vertical component and a horizontal component on the touch panel 106a according to the change in the position coordinates. When a touch-move of a predetermined distance or more is detected, it is determined that a slide operation has been performed.

An operation involving quickly moving an operating member on the touch panel 206a for a certain distance while keeping the operating member in touch with the touch panel 206a and then releasing the operating member is referred to as a flick. In other words, a flick is an operation in which an operating member quickly traces the surface of the touch panel 206a as though flicking at the touch panel 206a. A determination that a flick has been performed can be made (a determination that a flick has occurred following a slide operation can be made) when a detection of a touch-move of a predetermined distance or more at a predetermined speed or more is followed by a detection of a touch-up.

Furthermore, a touch operation involving touching a plurality of locations (for example, two points) at the same time and bringing the touch positions close to each other is referred to as a pinch-in, while a touch operation in which the touch positions are distanced from each other is referred to as a pinch-out. A pinch-out and a pinch-in are collectively referred to as a pinch operation (or, simply, a pinch). The touch panel 206a may adopt any touch panel system among various systems including a resistive system, a capacitive system, a surface acoustic wave system, an infrared system, an electromagnetic induction system, an image recognition system, and an optical sensor system. The touch panel may use either of a system in which a touch is detected when contact is made with the touch panel, or a system in which a touch is detected when an operating member approaches the touch panel.

The operation unit 206 includes the gesture detection unit 206f. Under the control of the CPU 201, the gesture detection unit 106f detects a gesture of the user (for example, the user's hand) from an image obtained by the image capturing unit 215 (an image of the physical space). The CPU 201 performs various types of processing (control) according to the detected gesture.

FIG. 2D is an external view of VR goggles (head-mounted adapter) 230 to which the display control device 200 can be attached. The display control device 200 can also be used as a head-mounted display by attaching it to the VR goggles 230. An insertion opening 231 is an opening for inserting the display control device 200. The entire display control device 200 can be inserted into the VR goggles 230 with the display surface of the display 205 facing toward a headband 232 (that is, toward the user) for fixing the VR goggles 230 to the user's head. The user can visually perceive the display 205 without holding the display control device 200 by hand while wearing the VR goggles 230 on which the display control device 200 is mounted on the head. In this case, when the user moves the head or the whole body, the posture of the display control device 200 also changes. At this time, the posture detection unit 213 detects the posture change of the display control device 200, and the CPU 201 performs processing for VR display (display in the "VR view" display mode) based on this posture change. In this case, the detection of the posture of the display control device 200 by the posture detection unit 213 is equivalent to the detection of the posture of the user's head (the direction in which the user's line of sight is directed). The VR display (VR view) is a display method (display mode) that can change the display area. The VR display displays a video image of a visual field area corresponding to the posture of the display control device 200 in the VR image.

It should be noted that the display control device 200 itself may be a head-mounted display that can be mounted on the head without VR goggles. The display control device 200 may be capable of detecting the line of sight or facial expression of the user, and the user may be able to operate the display control device 200 by the line of sight or the facial expression.

Figure 3A:
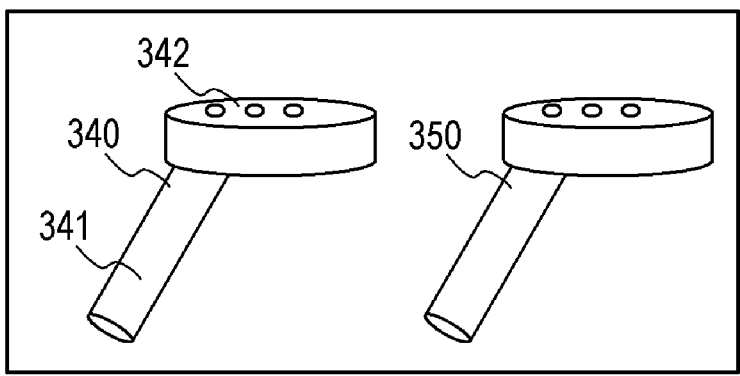
FIGS. 3A and 3B are external views of controllers.

FIG. 3A is an external view of controllers 340 and 350, which are examples of the controller 216 that can communicate with the display control device 200. The controller 340 is a grip-type controller operated by the user with the left hand. The user grips the hold portion 341 of the controller 340 with the left hand and operates the operation members arranged on the operation surface 342 with a finger (for example, the thumb) of the left hand. The controller 340 notifies the display control device 200 of an operation performed by the user. The controller 350 is a grip-type controller operated by the user with the right hand, and has the same configuration as the controller 340 (for example, a configuration in which the controller 340 is left-right reversed).

Figure 3B:
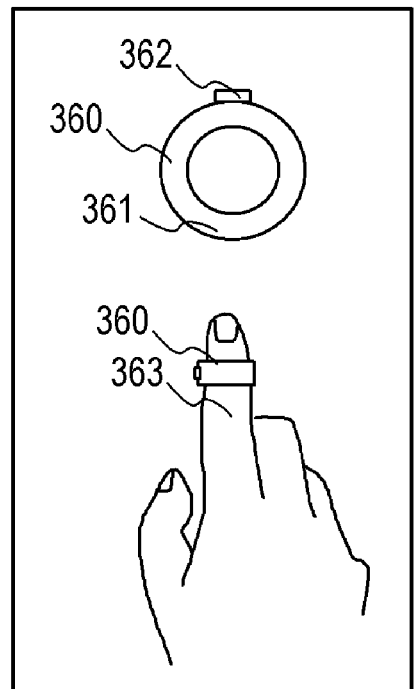

FIG. 3B shows a controller 360 that may also be used as the controller 216. The controller 360 is a ring-type controller worn on a finger 363 of the user to be operated. The controller 360 includes a ring portion 361 to be worn on a user's finger 363 and an operation member 362. The operation member 362 may be a push button, a rotary dial, or an optical trackpad, for example. An optical track pad is a type of operation member that can detect contact or proximity of a finger.

Figure 4:
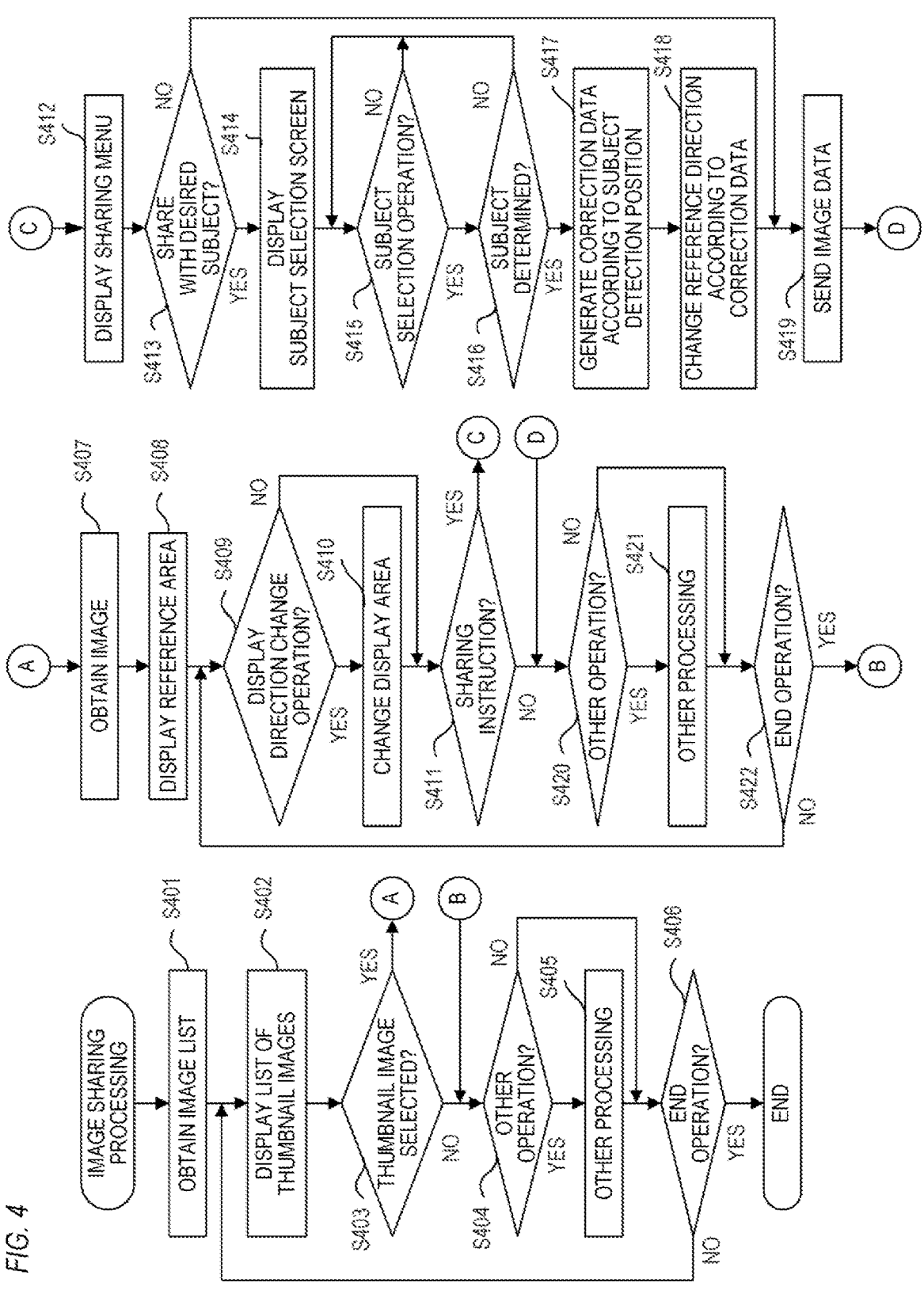
FIG. 4 is a flowchart showing an example of image sharing processing.

FIG. 4 is a flowchart illustrating image sharing processing of the display control device 200. The image sharing processing is performed when a program recorded in the non-volatile memory 203 (for example, a specific application program for performing VR display and sharing processing of VR images recorded on the recording medium 208) is loaded in the memory 202 and executed by the CPU 201. For example, the CPU 201 starts image sharing processing when the user performs an operation for displaying a list of images on the display 205 in order to share VR images.

The display control device 200 has a function of performing VR display of a VR image. When VR display is performed, a display area that is a partial area of the VR image is displayed. The display control device 200 also has a function of transmitting the image file of the VR image recorded on the recording medium 208 to a server or the like on a network so that other users can view the VR image. Hereinafter, the function of transmitting a VR image to an external device so that other users can view the VR image is referred to as a sharing function.

When using the sharing function of VR images, the user can specify the external device to which the image is transmitted (destination), the display area of the shared VR image (the display direction that is the direction from the center of the VR space to the center of the display area), and the like. The display control device 200 transmits additional information including orientation information regarding the specified display area (display direction) as metadata, for example, to the external device together with the VR image. When other users access the VR image (shared image) on the external device and display it in VR, the display area corresponding to the transmitted orientation information is displayed at the start of the VR display.

When the image sharing processing is started, at step S401, the CPU 201 obtains a list of image data stored on the recording medium 208. At step S402, the CPU 201 instructs the display 205 to display a list of thumbnail images of image data stored on the recording medium 208 based on the obtained list.

Figure 5A:
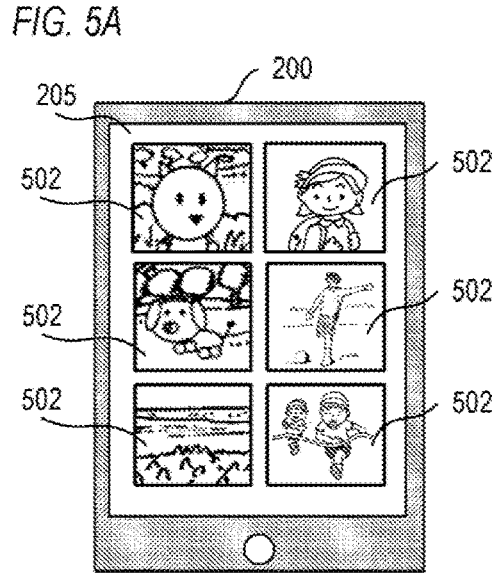
FIGS. 5A to 5F are examples of screens in image sharing processing.

FIG. 5A is an example of a screen displaying a list of thumbnail images on the display 205 of the display control device 200. A plurality of thumbnail images 502 are displayed (arranged) on the display 205. At step S403, the CPU 201 determines whether a selection operation has been performed on the operation unit 206 to select one of the displayed thumbnail images in the list. If a thumbnail image has been selected, the CPU 201 proceeds to step S407 to perform sharing processing of the VR image corresponding to the thumbnail image selected by the selection operation. If no thumbnail image has been selected, the process proceeds to step S404.

At step S404, the CPU 201 determines whether the user has performed any other operation (operation other than image selection) on the operation unit 206. If any other operation has been performed, the process proceeds to step S405. If no other operation has been performed, the process proceeds to step S406. At step S405, the CPU 201 performs processing (other processing) according to the other operation performed at step S404. Examples of other operations include a scrolling operation for scrolling the screen display to display thumbnail images that are not displayed in the list of thumbnail images, an operation for copying or deleting the VR image corresponding to a thumbnail image, and the like.

At step S406, the CPU 201 determines whether an end operation for ending the image list display has been performed on the operation unit 206. If the end operation has been performed, the image sharing processing shown in FIG. 4 ends. If the end operation has not been performed, the process returns to step S402.

The processing from step S407 to step S422 is an example of processing for sharing the VR image corresponding to the thumbnail image selected at step S403. At step S407, the CPU 201 reads and obtains the VR image corresponding to the selected thumbnail image from the recording medium 208.

At step S408, the CPU 201 displays on the display 205 a reference area of the VR image obtained at step S407. The reference area is an area displayed on the display 205 with the reference direction facing forward. Specifically, the CPU 201 extracts the orientation information (for example, orientation information generated by the image capturing device or the like when the VR image was captured and recorded together with the VR image) from the additional information of the image file of the obtained VR image. Hereinafter, the orientation indicated by this orientation information (orientation for VR display; display direction) is referred to as a reference direction. For example, the reference direction may be the direction of the optical axis of the lens of the image capturing device. The CPU 201 determines, as the display area (reference area), an area that is displayed corresponding to the size of the display 205 and has the position indicated by the reference direction of the obtained VR image in the center. The CPU 201 displays the image of the determined display area on the display 205.

Figure 5B:
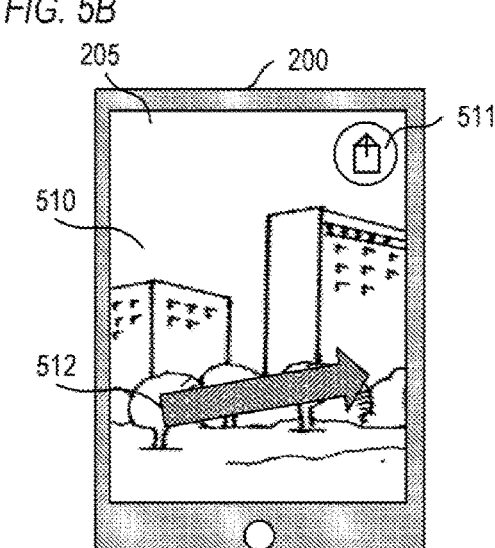

FIG. 5B is an example of a screen in which the VR image selected from the list of thumbnail images in FIG. 5A is displayed on the display 205 of the display control device 200. The display 205 displays a VR image 510. The display 205 also displays a share button 511 for instructing sharing of the VR image 510 on an external device and social networking service (SNS).

At step S409, the CPU 201 determines whether a change operation (change instruction) for changing the display direction of the VR display has been performed on the operation unit 206. The user may issue a change instruction by operating the operation unit 206, or may issue a change instruction by another method. For example, as shown in FIG. 5B, the user may issue a change instruction by performing a touch-move operation in the direction of arrow 512 on the touch panel 206a, or may issue a change instruction by changing the posture of the display control device 200. If a change operation has been performed, the process proceeds to step S410. If no change operation has been performed, the process proceeds to step S411.

Figure 5C:
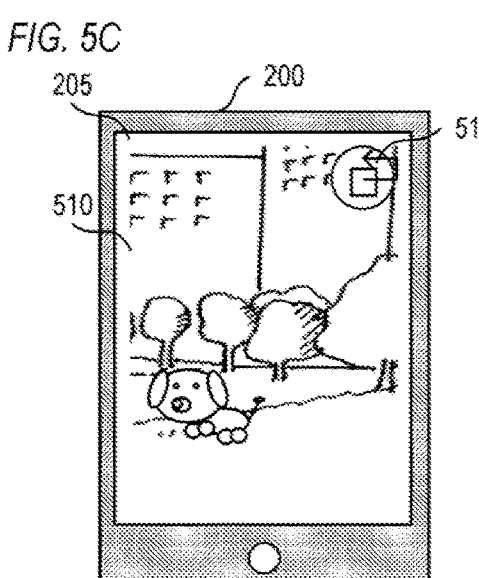

At step S410, the CPU 201 changes the display area of the VR image 510 displayed on the display 205 according to the change operation at step S409. FIG. 5C shows an example of a screen in which the display area has been changed by performing a touch-move operation in the direction of arrow 512 on the screen shown in FIG. 5B.

At step S411, the CPU 201 determines whether there is a sharing instruction to transmit the VR image being displayed as a shared image to an external device. The user can instruct sharing of the VR image by touching the share button 511 on the touch panel 206a, for example. If there is a sharing instruction, the process proceeds to step S412. If there is no sharing instruction, the process proceeds to step S420.

Figure 5D:
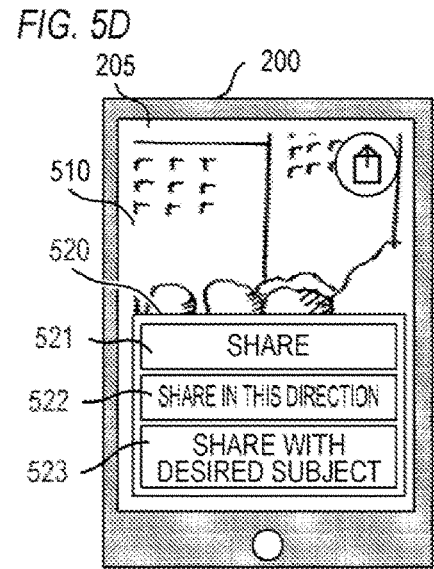

At step S412, the CPU 201 instructs the display 205 to display a sharing menu screen. FIG. 5D is an example of a sharing menu screen. When the share button 511 is touched in the state of FIG. 5B or 5C, the display screen of the display 205 transitions to the screen of FIG. 5D. In FIG. 5D, a sharing menu screen 520 is displayed superimposed on the VR image 510. The sharing menu screen 520 includes buttons 521, 522, and 523.

Button 521 ("Share") is a button for instructing display of the reference direction (reference area) displayed at step S408. Button 522 ("Share in this direction") is a button for instructing to display the display direction (display area) that has been changed at step S410. Button 523 ("Share with desired subject") is a button for instructing display of a display direction (display area) including the subject specified by the user. Button 523 is displayed when the VR image 510 is a VR moving image including multiple frames.

At step S413, the CPU 201 determines whether button 523, which is used to instruct to display in the display direction including the subject specified by the user, has been selected. If button 523 has been selected, the process proceeds to step S414. If button 523 has not been selected, and button 521 or button 522 has been selected, the process proceeds to step S419.

Figure 5E:
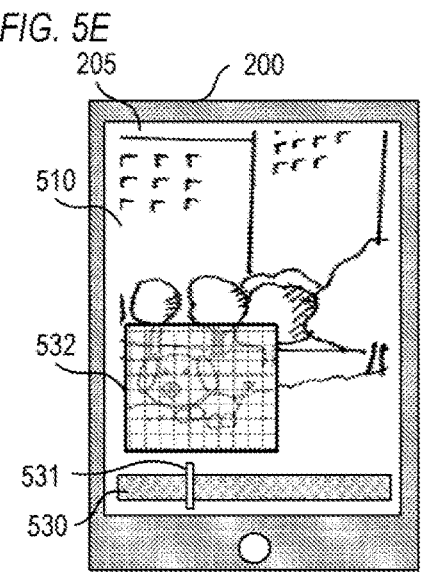

At step S414, the CPU 201 displays a subject selection screen. FIG. 5E is an example of the subject selection screen. The display 205 displays, superimposed on the VR image 510, a seek bar 530 indicating the playback position of the moving image and a slider 531 indicating the current playback position.

At step S415, the CPU 201 determines whether the user has performed an operation of selecting a specific subject to be shown to the viewers. The operation of selecting a subject includes, for example, the operation of touching a region where a desired subject is displayed on the touch panel 206a, or the operation of moving a finger so as to surround the desired subject. In FIG. 5E, the specific subject selected (specified) by the user is indicated by a subject selection frame 532 surrounding the subject.

If the user has performed an operation of selecting a subject, the process proceeds to step S416. If the user has not selected a subject, the CPU 201 returns to step S415 and waits until it receives a subject selection operation from the user. When the user does not select a subject even after the predetermined time has passed, the CPU 201 may proceed to the processing of step S419.

Figure 5F:
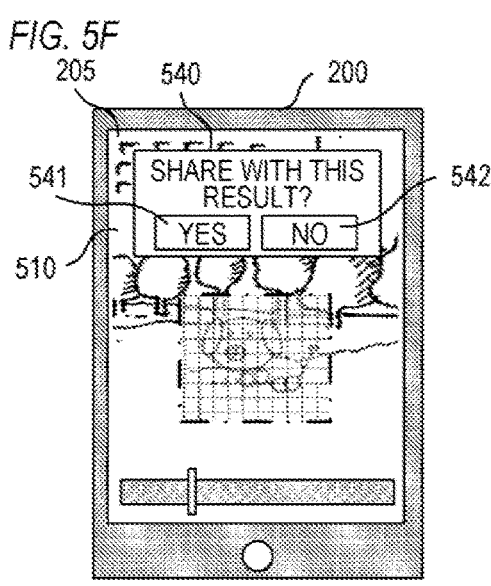

At step S416, the CPU 201 determines whether to determine the subject selected at step S415 as the specific subject. The CPU 201 displays a confirmation screen for the user to determine the selected subject as the specific subject. FIG. 5F is an example of a confirmation screen. The display 205 displays a confirmation screen 540, a YES button 541, and a NO button 542 superimposed on the VR image 510. If the user presses (taps) the YES button 541 to confirm the selected subject, the process proceeds to step S417. If the user presses (taps) the NO button 542, the CPU 201 returns to step S415 and waits until it receives a subject selection operation from the user.

At step S417, on the basis of the data of the subject selected at step S415, the CPU 201 detects the subject from each frame of the VR moving image. The CPU 201 generates, for each frame of the VR moving image, the angle difference between the reference direction of the frame and the direction of the detection position of the subject as correction data for the reference direction. The frame reference direction is set for each frame when the VR moving image is captured, and is the direction to the center of the display area. The frame reference direction is added to the VR moving image file as additional information.

At step S418, on the basis of the correction data generated at step S417, the CPU 201 changes (corrects) the reference direction of each frame of the VR moving image. The CPU 201 generates a VR moving image file by correcting the reference direction of each frame of the VR moving image and re-encoding the image, and stores the file on the recording medium 208. By correcting the reference direction of each frame of the VR moving image and re-encoding the image, the CPU 201 can generate a corrected VR moving image so that the specific subject is tracked in the initial state and sequentially played back. The initial state is the state before the display direction (display area) is changed by a user's operation, a posture change of the display control device 200, or the like. The CPU 201 may replace the original VR moving image with the corrected VR moving image in which the reference direction is corrected, or generate a corrected VR moving image as data different from the original VR moving image and store it on the recording medium 208. Also, the correction data may be stored on the recording medium 208 in association with the file of the VR moving image, or may be added to the file of the VR moving image and stored.

At step S419, the CPU 201 transmits the VR moving image file (image data) generated at step S418 to the external device, and shares the image data as a shared image. When button 521 ("Share") is selected at step S413, the CPU 201 transmits the image data to the external device or the like without changing the reference direction set at the time of shooting. Furthermore, when button 522 ("Share in this direction") is selected at step S413, the CPU 201 corrects the reference direction of each frame to the display direction being displayed (current display direction) and transmits the image data to the external device or the like. The display direction being displayed is the current display direction after the user has changed the display area by a touch-move operation or the like.

At step S420, the CPU 201 determines whether any other operation (operation other than sharing instruction) has been performed on the operation unit 206. If any other operation has been performed, the process proceeds to step S421. If no other operation has been performed, the process proceeds to step S422. At step S421, the CPU 201 performs processing (other processing) according to the other operation performed at step S420. Examples of other operations include an editing operation for adjusting the color, brightness, and the like of the image and an operation of clipping out a portion of the VR image.

At step S422, the CPU 201 determines whether an end operation for ending the processing for sharing the VR image selected at step S403 has been performed. If the end operation has been performed, the process proceeds to S404. If no end operation has been performed, the process returns to step S409.

Figure 6:
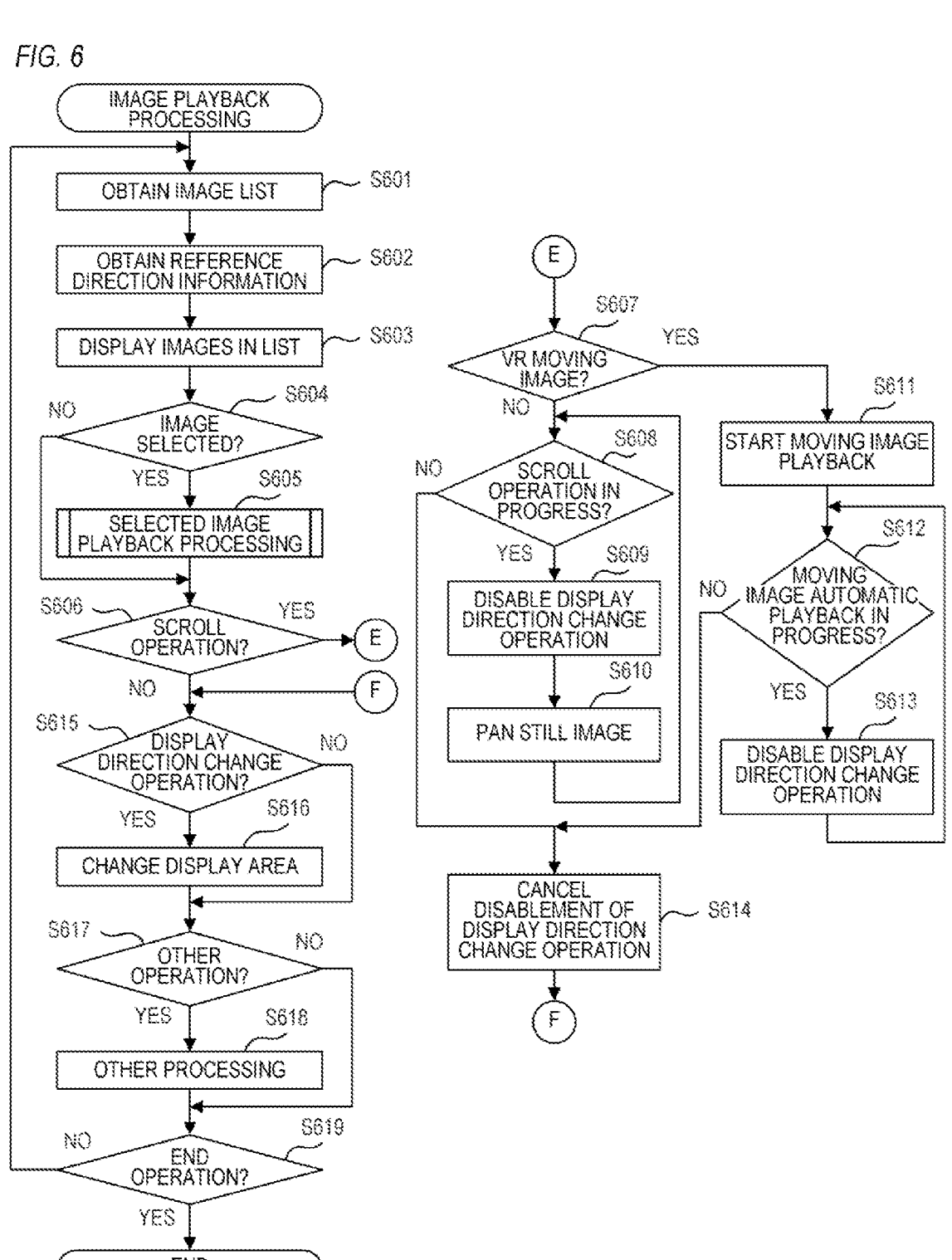
FIG. 6 is a flowchart of an example of image playback processing.
Figure 7:
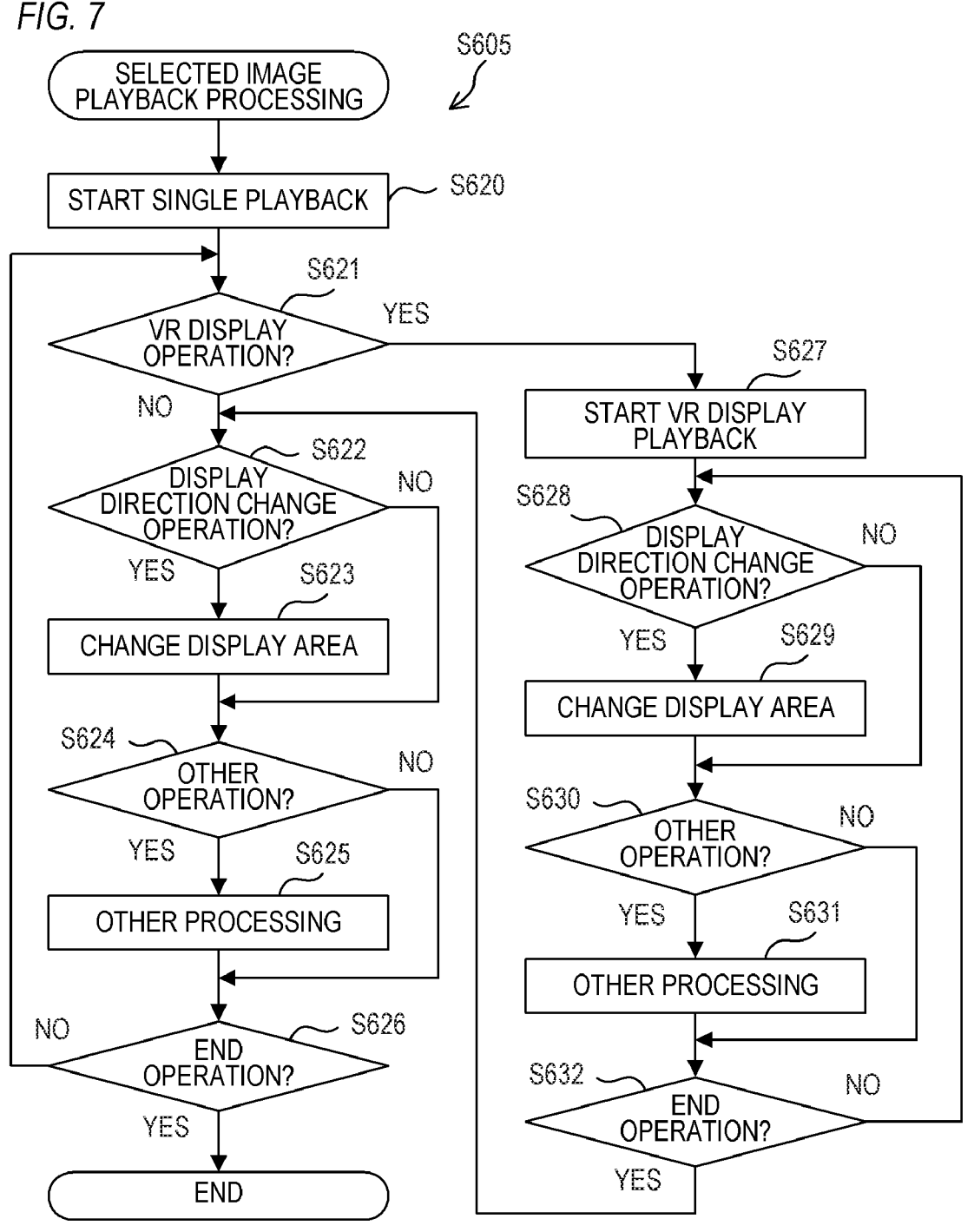
FIG. 7 is a flowchart of an example of selected image playback processing.

FIG. 6 is a flowchart of an example of image playback processing of the display control device 200. FIG. 7 is a flowchart of an example of selected image playback processing for an image selected from the images displayed in a list. FIGS. 6 and 7 show an example of processing for viewing a VR image generated in the image sharing processing of FIG. 4 as a shared image on a social networking service (SNS) along with other images. Image playback processing and selected image playback processing can be performed using the display control device 200.

A user who is a viewer can display a desired image on the display 205 by performing a scroll operation to change the display position of the multiple images displayed on a timeline. Images displayed on the display 205 are not limited to VR images (including VR still images and VR moving images), and may include various images such as two-dimensional images and images including text. When the user scrolls through and views multiple images, the display area of each VR image is preferably controlled so as to be automatically changed on the basis of the reference direction specified by the sharer. The display control device 200 automatically controls the display area of the VR image during a scroll operation, thereby allowing the user to view the display area that reflects the intention of the sharer. Furthermore, by moving the display area of the VR image in the pan direction, the display control device 200 allows the user to recognize that it is a VR image and to view parts other than the display area including the reference direction.

On the other hand, when the VR image selected by the user on the timeline is displayed individually, the user may want to manually change the display area of the VR image, so that it is preferable to allow the display area of the VR image to be freely changed by a manual operation by the user. That is, the display area of the VR image is preferably controlled so as not to be automatically changed on the basis of the reference direction.

As such, the methods of changing the display area of the VR image (whether to change it automatically or manually) are preferably switched on the basis of the viewing state, such as whether multiple images including a VR image are displayed or a VR image is displayed individually. Additionally, the methods of changing the display area of the VR image are preferably switched appropriately depending on the viewing state concerning whether the VR image is a moving image or a still image.

In the processing shown in FIGS. 6 and 7, the display control device 200 switches the methods of changing the display area of the VR image according to the viewing state of the VR image by the user (viewer). Specifically, the display control device 200 controls to automatically change the display area of the VR image on the basis of the reference direction by disabling a display direction change operation (predetermined operation). Furthermore, the display control device 200 controls to change the display area of the VR image on the basis of the display direction change operation by the user by canceling the disablement of the display direction change operation (predetermined operation).

The processing of FIGS. 6 and 7 is performed when a program recorded in the non-volatile memory 203 (for example, a specific application program for performing VR display of VR images recorded on the recording medium 208) is loaded in the memory 202 and executed by the CPU 201. For example, the CPU 201 starts image playback processing when the user performs the operation of displaying a list of shared images on the display 205 to play a shared VR image.

When the image playback processing is started, at step S601, the CPU 201 obtains a list of image data stored on the recording medium 208. At step S602, the CPU 201 obtains information on the reference direction of the VR image among the images read from the recording medium 208. The information on the reference direction of the VR image may be added as metadata to the image data file of the VR image, or may be stored in a separate file associated with the image data file. At step S603, the CPU 201 displays a list of images (shared images) obtained at step S601.

Figure 8A:
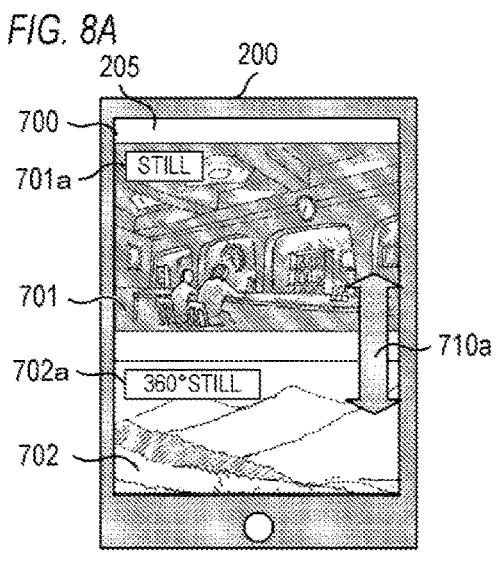
FIGS. 8A to 8F are examples of screens in image playback processing.

FIG. 8A is an example of a screen displaying a list of images obtained at step S601 on the display 205 of the display control device 200. The screen shown in FIG. 8A is an example of a second screen. The display 205 displays an SNS timeline 700 (list of images). The timeline 700 includes a still image 701 and an omnidirectional still image 702 arranged and displayed in the vertical direction. The user can scroll a plurality of images in the timeline 700 by performing a touch-move scroll operation on the touch panel 206a in the directions indicated by arrow 710a.

On the still images 701 and 702, object 701a and object 702a, which are GUI objects indicating the type of image, are superimposed. Object 701a ("STILL") indicates that the image is a still image that is not a VR image. Object 702a ("360° STILL") indicates that the image is a still image of a VR image (an omnidirectional image in this example).

At step S604, the CPU 201 determines whether a selection operation has been performed on the operation unit 206 to select one of the images displayed in the list. If an image has been selected, the process proceeds to step S605. If no image has been selected, the process proceeds to step S606.

At step S606, the CPU 201 determines whether a scroll operation has been performed on the displayed list of images. If a scroll operation has been performed, the process proceeds to step S607. If no scroll operation has been performed, the process proceeds to step S615.

At step S607, the CPU 201 determines whether the image displayed on the display 205 in the list of images included in the timeline 700 is a VR moving image. If the image displayed on the display 205 is a VR moving image, the process proceeds to step S611. If the image displayed on the display 205 is not a VR moving image, the process proceeds to step S608.

At step S608, the CPU 201 determines whether a scroll operation is in progress. If a scroll operation is in progress, the process proceeds to step S609. If no scroll operation is in progress, the process proceeds to step S614.

At step S609, the CPU 201 disables the display direction change operation (predetermined operation). That is, the CPU 201 controls such that, when the display direction change operation by the user is received while the operation of scrolling the list of images is being performed, the display area is not changed according to the display direction change operation. The display direction change operation is disabled because the display area of the VR image is controlled to be in the direction that the sharer of the VR image wants to show, while the user is viewing and scrolling the list of images in the timeline 700.

Examples of the display direction change operation include the operation of changing the display area by a touch-move operation on the VR image on the touch panel 206a, and the operation of changing the posture of the display control device 200. The CPU 201 can detect a touch-move operation on the VR image and control to change the display area of the VR image on the basis of the direction of the touch-move. When the user changes the posture of the display control device 200, the CPU 201 can control to change the display area of the VR image on the basis of the position and posture of the display control device 200 detected by the posture detect portion 213.

At step S610, when a still VR image is displayed by a scroll operation on the timeline 700 (image list), the CPU 201 pans the display area of the VR image in the lateral direction of the display 205, for example. By performing pan display, the CPU 201 allows the user to know that the image being displayed is a VR image and that the display area can be changed.

Figure 8B:
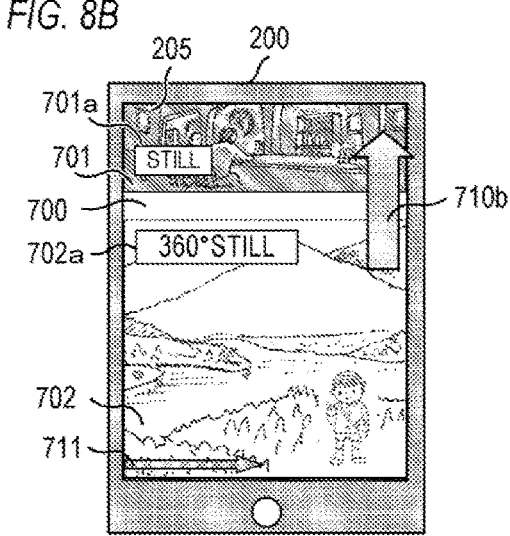

FIG. 8B is an example of a screen in a situation where a still image 702 that is an omnidirectional image is displayed on the display 205 during a scroll operation on the timeline 700. When the still image 702 is displayed on the display 205 in response to a touch-move scroll operation in the direction of arrow 710b, the CPU 201 displays the display area centered around the reference direction in the still image 702, and then performs pan display in which the display area is moved in the direction of arrow 711. The reference direction of the still VR image may be the direction set at the time of shooting, or may be the direction specified by the user (sharer). By performing pan display, the display control device 200 can show the direction the VR image sharer wants the viewers to see and also indicate to the user that the displayed image is a VR image.

In the processing at step S610, the CPU 201 performs control to automatically change the display area. As such, an additional change of the display area in response to an operation by the user would result in overlapping of change processing of the display area. To avoid unexpected movement of the viewpoint due to overlapping display area change processing, the CPU 201 disables a display area change operation by the user at step S609. When the image displayed on the display 205 is not a VR image, the CPU 201 does not need to perform the processing of steps S609 and S610.

At step S611, the CPU 201 automatically starts playing the VR moving image. That is, when the VR image displayed on the display 205 by a scroll operation is a moving image, the CPU 201 starts playing the VR image from the time point at which the VR image is displayed on the display 205. When the VR image has been played to the end and is displayed on the display 205, the CPU 201 may play the VR image from the beginning.

When the VR moving image is a moving image longer than a predetermined length, the CPU 201 may control to change the display area of the VR moving image on the basis of the display direction change operation (predetermined operation) without starting to play the VR moving image. When the VR moving image is longer than a predetermined length, by preventing the VR moving image from being played, the user can change the display area of the VR moving image without waiting for the end of playback.

Figure 8C:
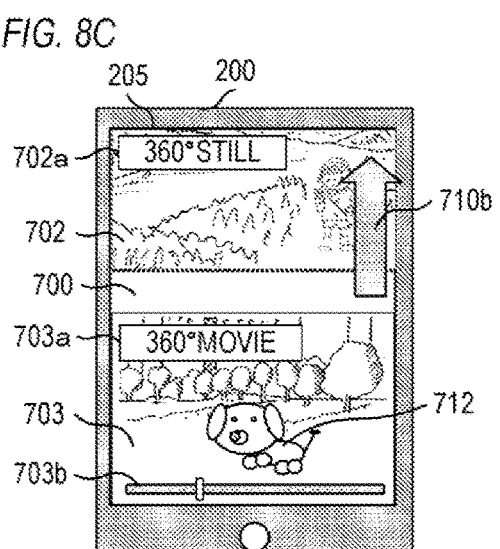

FIG. 8C is an example of a screen in a situation where the timeline 700 is further scrolled downward from the state of FIG. 8B by a touch-move scroll operation in the direction of arrow 710b. On the screen of FIG. 8C after scrolling, a moving image 703 that is an omnidirectional image is displayed on the display 205.

The display 205 displays an object 703a and a seek bar 703b superimposed on the moving image 703. The object 703a ("360° MOVIE") is a GUI object that indicates the type of image, and indicates that the moving image 703 is a moving image of VR image (an omnidirectional image in this example). The seek bar 703b indicates the playback position of the moving image 703.

Figure 8D:
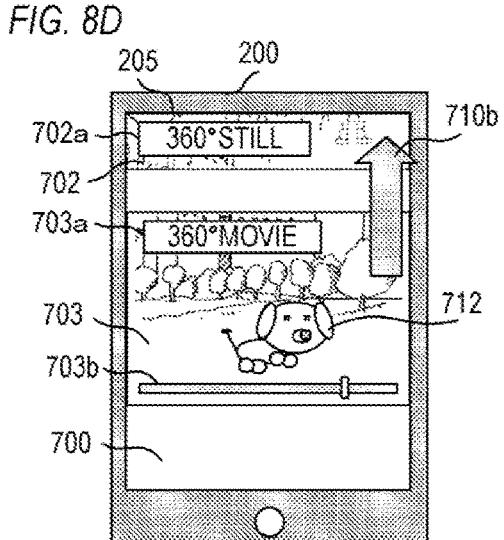

FIG. 8D is an example of a screen in a situation where the timeline 700 is further scrolled downward from the state of FIG. 8C by a touch-move scroll operation in the direction of arrow 710b. The seek bar 703b indicates that the automatic playback of the moving image 703 has progressed from the state shown in FIG. 8C.

The subject 712 is the specific subject determined at step S416, and in each frame of the moving image 703, the reference direction is corrected to the direction in which the subject 712 is present. For each frame of the moving image 703, the CPU 201 determines the display area centered around the reference direction, thereby playing the moving image with the subject 712 in the center.

At step S612, the CPU 201 determines whether automatic playback of the VR moving image is in progress. If the automatic playback is in progress, the process proceeds to step S613. If automatic playback is not in progress, the process proceeds to step S614.

At step S613, the CPU 201 disables a display direction change operation in the same manner as step S609. According to the reference direction corrected at step S417 and step S418 in FIG. 4, the CPU 201 determines the display area of each frame and play back the VR moving image. That is, the CPU 201 corrects the reference direction of each frame to the direction that the sharer of the VR moving image wants the viewers to see (for example, the direction in which a specific subject is present), thereby changing the display area for the playback of the VR moving image to the area the sharer wants to show. If the display area is further changed in response to a user operation while the VR moving image is playing, change processing of the display area would overlap. To avoid unexpected movement of the viewpoint due to overlapping display area change processing, the CPU 201 disables a display area change operation by the user until the playback of the VR moving image ends.

Step S614 cancels the disablement of display direction change operation at steps S609 and S613. That is, when receiving a display direction change operation (predetermined operation) from the user while the operation of scrolling the list of images is not performed, the CPU 201 changes the display area of the VR image on the basis of the display direction change operation.

Steps S615 and S616 are the same as steps S409 and S410 of the image sharing processing shown in FIG. 4, respectively.

At step S617, the CPU 201 determines whether any other operation (operation other than a display direction change operation) has been performed on the operation unit 206. If any other operation has been performed, the process proceeds to step S618. If no other operation has been performed, the process proceeds to step S619. At step S618, the CPU 201 performs processing (other processing) according to the other operation performed at step S617. Examples of other operations include an operation of posting a comment on content posted by other people and an operation of selecting a reaction icon.

At step S619, the CPU 201 determines whether an end operation for ending the image playback processing shown in FIG. 6 has been performed. If an end operation has been performed, the image playback processing ends. If no end operation has been performed, the process returns to step S601.

FIG. 7 is a flowchart illustrating details of the selected image playback processing at step S605 of FIG. 6. The processing from step S620 to step S626 is single playback processing for individually playing and displaying an image selected from the image list described with reference to FIGS. 8A to 8D at step S604.

Figure 8E:
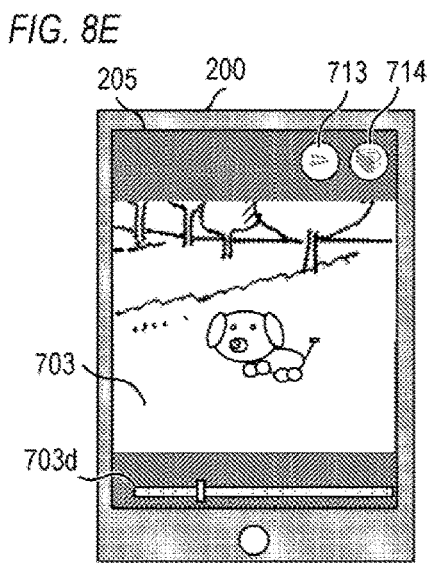

FIG. 8E is an example of a screen for playing a moving image 703 selected from the image list shown in FIG. 8D. The screen shown in FIG. 8E is an example of a first screen. For example, when the user selects a desired shared image from the image list by a touch operation or the like, the CPU 201 switches to the screen of FIG. 8E that displays the selected shared image individually. The display 205 displays the moving image 703 individually and further displays a seek bar 703d. The display 205 also displays a return button 713 and a VR display button 714. The return button 713 is a button (item) for returning to the image list shown in FIG.

8D. The VR display button 714 is a button (item) for VR display of the image displayed on the display 205.

At step S620, the CPU 201 starts playing the image selected at step S604. When the image selected at step S604 is a moving image, the CPU 201 may start playback when this image is displayed on the display 205, or may start playback in response to a user's operation. At step S621, the CPU 201 determines whether the VR display button 714 has been operated (selected). If the VR display button 714 has been operated, the process proceeds to step S627. If the VR display button 714 has not been operated, the process proceeds to step S622.

At step S622, the CPU 201 determines whether the display direction change operation (change instruction) for changing the display direction of the VR display has been performed on the operation unit 206. If the display direction change operation has been performed, the process proceeds to step S623. If no display direction change operation has been performed, the process proceeds to step S624. At step S623, the CPU 201 changes the display area of the VR image displayed on the display 205 according to the display direction change operation at step S622.

At step S624, the CPU 201 determines whether any other operation (operation other than a display direction change operation) has been performed on the operation unit 206. If any other operation has been performed, the process proceeds to step S625. If no other operation has been performed, the process proceeds to step S626. Examples of other operations include an editing operation for adjusting the color, brightness, and the like of the image. At step S625, the CPU 201 performs processing (other processing) according to the other operation performed at step S624.

At step S626, the CPU 201 determines whether an end operation for ending the selected image playback processing shown in FIG. 7 has been performed. An operation for ending the selected image playback processing may be a selection operation of the return button 713 by the user, for example. If an end operation has been performed, the selected image playback processing ends, and the process proceeds to step S606 in FIG. 6. If no end operation has been performed, the process returns to step S621.

The processing from step S627 to step S632 is the processing of playing and displaying a VR image in VR for viewing with the VR goggles 230. At step S627, the CPU 201 plays and displays the VR image in VR. When the VR image is a moving image, the CPU 201 may start playback when the VR image is displayed on the display 205, or may start playback in response to a user's operation.

Figure 8F:
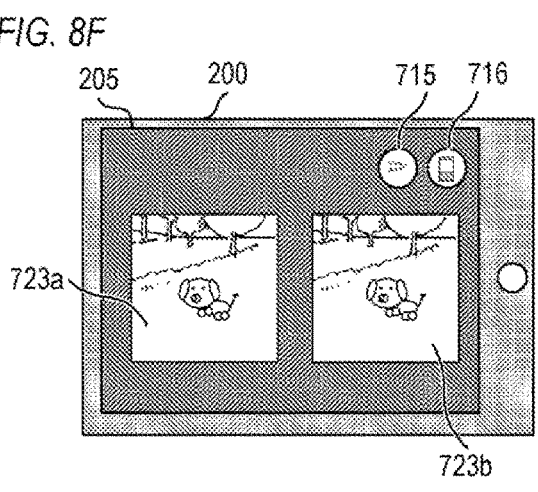

FIG. 8F is an example of a screen for playing and displaying a VR image in VR. The screen shown in FIG. 8F is an example of a third screen. The display 205 displays a left eye image 723a and a right eye image 723b. The display 205 also displays a return button 715 and a single playback button 716. The return button 715 is a button (item) for ending the VR display and returning to the image list illustrated in FIG. 8D. The single playback button 716 is a button (item) for ending the VR display of the image displayed on the display 205 and returning to step S622. When the VR image is a moving image, playback of the VR image may be started or stopped in response to a user's operation.

Steps S628 and S629 are similar to steps S622 and S623, respectively. To play and display a VR image in VR, the CPU 201 changes the display area of the VR image displayed on the display 205 upon receiving the display direction change operation for changing the display direction of VR display (including the operation of changing the posture of the display control device 200).

At step S630, the CPU 201 determines whether any other operation (operation other than a display direction change operation) has been performed on the operation unit 206. If any other operation has been performed, the process proceeds to step S631. If no other operation has been performed, the process proceeds to step S632. Examples of other operations include the operation of moving the slider indicating the playback position of the VR moving image on the seek bar using the controllers 340 and 350 described with reference to FIG. 3A. In this case, the screen of FIG. 8F may display a seek bar as in FIG. 8E. At step S631, the CPU 201 performs processing (other processing) according to the other operation performed at step S630.

At step S632, the CPU 201 determines whether an end operation for ending the VR display of the VR image has been performed. Examples of an end operation for ending the VR display include a selection operation of the return button 715 or the single playback button 716. If an end operation has been performed, the process proceeds to step S622. It should be noted that the CPU 201 may proceed to step S606 if an end operation has been performed. If no end operation has been performed, the process returns to step S628.

The VR image is not limited to an omnidirectional image of 360 degrees in the up-down direction and 360 degrees in the right-left direction, and may be an image of 180 degrees or less in the up-down direction and the right-left direction. Also, an image complying with the VR180 format may be displayed with a GUI object indicating the compliance with the format superimposed on the image.

The processing of steps S417 and S418 in FIG. 4 shows an example of processing for correcting the reference direction of the VR moving image and re-encoding using the generated correction data, but the processing is not limited to this. For example, the display control device 200 may store the correction data as a file separate from the VR moving image file, and may record the correction data file and the VR moving image file in association with each other on the recording medium 208. In this case, at step S419, the display control device 200 may transmit the original VR moving image file whose reference direction is not changed and the corresponding correction data file to the external device. Then, when playing the VR moving image at step S611 of FIG. 6, the display control device 200 uses the correction data to play the VR moving image while correcting the reference direction of each frame of the original VR moving image.

Also, when displaying the sharing menu at step S412 of FIG. 4, the display control device 200 may allow the user to select multiple sharing destinations. The display control device 200 may allow the user to select, for each sharing destination that is the transmission destination of the VR moving image, one of the sharing methods of button 521 ("Share"), button 522 ("Share in this direction"), and button 523 ("Share with desired subject").

Also, at step S417 of FIG. 4, for a frame in which the specific subject specified by the user is not detected (is not present), the display control device 200 can change the reference direction according to the position of the specific subject detected in another frame. Another frame may be a frame before or after the frame in which the subject is not detected, for example. The reasons that a subject that was detected in VR image immediately before is no longer detected include a situation where the subject turns around and its distinctive features, such as the face, are no longer detected, and a situation where the subject moves away and becomes undetectable. By adopting the position of the subject detected in the most recent frame, the display control device 200 can appropriately correct the reference direction even for frames in which the subject is not detected.

The specific subject to be tracked at step S415 is not limited to a unique person or animal, and may be specified by the type of tracking target such as person, animal, car, or airplane. Additionally, a specific subject may be specified by a unique subject and the type of tracking target. Specifying a specific subject by a combination of a unique subject and the type of tracking target improves the accuracy in detecting a specific subject.

At step S419 in FIG. 4, when the corrected VR image (image data of the VR moving image) is transmitted to an external device and shared, the reference direction of the original VR image held on the recording medium 208 may be overwritten with the reference direction of the shared VR image.

The VR moving image that is automatically played back at step S611 of FIG. 6 may be played in a loop. Until the moving image being automatically played is hidden by a scroll operation on the timeline 700, an operation of changing the display direction is disabled. Alternatively, the display control device 200 may cancel the disablement of a display direction change operation when the playback is completed once, and change the display area in response to a display direction change operation by the user during the second and subsequent playback. At step S611, only the VR moving image shared by operating button 523 ("Share with desired subject") may be automatically played.

Also, button 523 ("Share with desired subject") may be displayed even when the image obtained at step S407 of FIG. 4 is a still VR image. In particular, when a plurality of still VR images sequentially captured by continuous shooting (continuous shoot) or interval shooting at predetermined time intervals are obtained as a group of still images, the display control device 200 may display button 523.

In the processing from step S607 to step S614 in FIG. 6, the processing for a display direction change operation that is performed when the image displayed on the display 205 is a VR moving image differs from the processing that is performed when the image is a still image (including an image other than a VR image). The present invention is not limited to this, and a VR moving image with a duration of a predetermined number of seconds or less (short moving image) may be processed in response to a display direction change operation in the same manner as a still image and the like. For example, since the playback of a short moving image ends within a duration of the predetermined number of seconds, a display direction change operation by the user is disabled during a scroll operation on the timeline 700, but the disablement may be canceled after the scroll operation ends.

The display control device 200, which is an example of the electronic device according to the present invention, may be configured as a housing integrated with the VR goggles 230. Additionally, the display control device 200 may be configured integrally with the digital camera 100.

In the above embodiment, according to the viewing state of the VR image, the display control device 200 switches whether to automatically change the display direction of the VR image or to change it manually. For example, the viewing state may be the state of the display screen, such as whether the VR image is displayed together with other multiple images, whether the VR image is displayed individually, or whether the VR image is displayed in VR. The viewing state also includes whether the VR image is a moving image or a still image. By appropriately switching whether to change the display direction of the VR image automatically or manually according to the viewing state, the display control device 200 can achieve both a viewing environment that reflects the intention of the sharer and an environment in which the viewer can freely view the VR image.

The display control device 200 corrects the reference direction of each of the multiple VR images captured sequentially (including VR moving images, multiple VR images captured by interval shooting or continuous shooting) to the direction in which the specific subject that the sharer wants to show is present. By correcting the reference direction, the corrected VR image is sequentially played back in the initial state while tracking the specific subject specified by the sharer. Moreover, unlike a moving image generated by clipping out a specific subject, the user can change the display area of the corrected VR image according to the present embodiment in the same manner as the original VR image.

Some preferred embodiments of the present invention are described above in detail, but the present invention is not limited to these specific embodiments, and various embodiments within the scope of the present invention are also included in the present invention. The foregoing embodiments are merely illustrative embodiments of the present invention, and the embodiments may be combined as appropriate.

The present invention can also be carried out by performing the following processing. That is, software (programs) that implement the functions of the above-described embodiments are supplied to a system or a device via a network or various storage media. The computer (or CPU, MPU, and the like) of the system or apparatus reads the supplied program into memory and executes it. In this case, these programs and storage media storing the programs constitute the present invention.

The various controls (processing) described as being performed by the CPU 201 and the system control unit 50 may be performed by a single piece of hardware, or may be performed by a plurality of pieces of hardware sharing the processing.

According to the present invention, it is possible to provide an electronic device that can achieve both a viewing environment that reflects the intention of the sharer and an environment in which the viewer can freely view a VR image, according to the viewing state of the VR image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-066453, filed on Apr. 14, 2023, which is hereby incorporated by reference herein in its entirety.

What is claimed is:

1. An electronic device comprising:
a processor; and
a memory storing a program which, when executed by the processor, causes the electronic device to:
    switch between a first screen that displays a VR image individually and a second screen that displays a plurality of images including the VR image; and
    control a change in a display area of the VR image, the display area being at least a part of the VR image, wherein
    on the first screen, the display area of the VR image is changed based on a predetermined operation for changing the display area of the VR image, and
    on the second screen, the display area of the VR image is not changed based on the predetermined operation.

2. The electronic device according to claim 1, wherein the predetermined operation includes an operation of changing a posture of the electronic device and a touch-move operation on the VR image.

3. The electronic device according to claim 1, wherein the program, when executed by the processor, further causes the electronic device to:
    switch to a third screen that displays a right eye image and a left eye image of the VR image, and
    control, on the third screen, to change the display area of the VR image based on the predetermined operation.

4. The electronic device according to claim 3, wherein the program, when executed by the processor, further causes the electronic device to, in a case where the VR image is a moving image on the third screen, start or stop playing the VR image in response to an operation by a user.

5. The electronic device according to claim 1, wherein the program, when executed by the processor, further causes the electronic device to, in a case where the VR image is a moving image on the first screen, start or stop playing the VR image in response to an operation by a user.

6. The electronic device according to claim 1, wherein the program, when executed by the processor, further causes the electronic device to, in a case where the VR image is a moving image on the second screen, control to determine a display area of each frame included in the VR image based on a reference direction of the frame.

7. The electronic device according to claim 1, wherein the program, when executed by the processor, further causes the electronic device to play the VR image from a beginning thereof in a case where the VR image is a moving image and has been played to an end and is displayed on the second screen.

8. The electronic device according to claim 1, wherein the program, when executed by the processor, further causes the electronic device to, in a case where the VR image on the second screen is a moving image that is longer than a predetermined length, control to change the display area of the VR image based on the predetermined operation.

9. A method for controlling an electronic device, the method comprising:
    switching between a first screen that displays a VR image individually and a second screen that displays a plurality of images including the VR image; and
    controlling a change in a display area of the VR image, the display area being at least a part of the VR image, wherein
    on the first screen, the display area of the VR image is changed based on a predetermined operation for changing the display area of the VR image, and
    on the second screen, the display area of the VR image is not changed based on the predetermined operation.

10. A non-transitory computer-readable medium that stores a program for causing a computer to execute a method for controlling an electronic device, the control method comprising:
    switching between a first screen that displays a VR image individually and a second screen that displays a plurality of images including the VR image; and
    controlling a change in a display area of the VR image, the display area being at least a part of the VR image, wherein
    on the first screen, the display area of the VR image is changed based on a predetermined operation for changing the display area of the VR image, and
    on the second screen, the display area of the VR image is not changed based on the predetermined operation.

11. The electronic device according to claim 1, wherein the predetermined operation includes a touch-move operation on the VR image.

12. The electronic device according to claim 1, wherein the predetermined operation includes a drag operation of a mouse.

13. The electronic device according to claim 1, wherein the predetermined operation includes an operation of pressing on a direction button.

14. The electronic device according to claim 1, wherein the VR image is an omnidirectional image captured by an omnidirectional camera, or a panoramic image with a video image area wider than the display area that can be displayed at a time.

* * * * *